United States Patent [19]
Wengenroth

[11] Patent Number: 5,184,532
[45] Date of Patent: Feb. 9, 1993

[54] SHEAR SYSTEM FOR CUTTING PROFILE STEEL RODS

[75] Inventor: Kurt Wengenroth, Wuppertal, Fed. Rep. of Germany

[73] Assignee: Rolf Peddinghaus, Ennepetal, Fed. Rep. of Germany

[21] Appl. No.: 822,466

[22] Filed: Jan. 17, 1992

[30] Foreign Application Priority Data

Jan. 22, 1991 [DE] Fed. Rep. of Germany ....... 4101643

[51] Int. Cl.$^5$ .............................................. B23D 15/04
[52] U.S. Cl. ......................................... 83/23; 83/378; 83/390
[58] Field of Search ................. 83/378, 384, 383, 390, 83/13, 157, 23

[56] References Cited

U.S. PATENT DOCUMENTS

| | | | |
|---|---|---|---|
| 3,486,406 | 12/1969 | Woodward | 83/378 |
| 3,570,343 | 3/1971 | Wolnosky | 83/390 X |
| 3,779,116 | 12/1973 | Curtis et al. | 83/383 X |
| 3,908,496 | 9/1975 | Moelbert | 83/378 X |

FOREIGN PATENT DOCUMENTS

1815691 7/1970 Fed. Rep. of Germany .

Primary Examiner—Frank T. Yost
Assistant Examiner—Rinaldi Rada
Attorney, Agent, or Firm—Herbert Dubno

[57] ABSTRACT

In a shear a workpiece is pressed by a holddown against a stationary blade so as to leave a piece to be cut off projecting past the blade, a movable blade is displaced forward past the stationary blade to cut off the piece, and a cut-off holder is pressed in back against the piece by a fluid-powered holding cylinder and moves back in the direction as the piece is cut off. Pressure is substantially completely relieved in the cylinder as soon as the movable blade starts to cut through the workpiece so that the cut-off holder does not substantially resist forward movement in the cutting direction. The movable blade is pressed forward in the direction against the workpiece by a main cylinder so that pressure in the main cylinder reaches a maximum level just before the movable blade starts to cut through the workpiece. The pressure in the main cylinder is monitored to trigger relief of pressure in the holding cylinder when the monitored pressure starts to decrease from the maximum level. It is also possible to monitor travel of the movable blade or cut-off holder and to trigger relief of pressure in the holding cylinder when the main blade or cut-off holder reaches a predetermined position. Similarly one can monitor elapsed time from the start of a cut through the workpiece and trigger relief of pressure in the holding cylinder a predetermined time after the cut starts.

10 Claims, 2 Drawing Sheets

SHEAR SYSTEM FOR CUTTING PROFILE STEEL RODS

FIELD OF THE INVENTION

The present invention relates to a shear for cutting profile steel rods. More particularly this invention concerns a method of and system for operating such a shear.

BACKGROUND OF THE INVENTION

A standard heavy-duty shear for cutting profiled steel rods and like workpieces has a frame supporting a stationary main blade, a movable blade displaceable adjacent the main blade, a main holddown which presses the workpiece down against the main blade prior to and during the cut, and a cut-off holder which presses the cut-off end of the workpiece up against the movable blade during the cut. The cut-off holder serves to maintain the piece being cut off in accurate position before and as it is sheared off the workpiece.

In German patent document 1,815,691 filed Dec. 19, 1968 by Joachim Wepner such a system is disclosed where the cut-off holder presses the workpiece fairly solidly back in the cutting direction against the movable blade. Thus not only must the movable blade be pushed forward with a force sufficient to shear the workpiece, but this force must additionally be able to overcome the opposite force of the cut-off holder. Typically pressure in a cylinder pushing the cut-off holder against the workpiece is established by an overpressure valve so that as the cut-off holder is forced down by the movable blade, this valve is forced open by back pressure to relieve the extra pressure created in the holder cylinder.

The main disadvantage of this system is that the main cylinder that pushes the movable blade down (it being noted that the terms "down" and "up" are used here purely for convenience and that the system would work perfectly well if inverted or on its side) must work not only against the workpiece, but against the cut-off holder. The fluid pumped into and out of the holddown cylinder does no meaningful work, but still the system must move and cool this fluid and provide sufficient pressure to the main cylinder for it to do its double job. The result is therefore a fairly complex system that is more costly to operate than the work it does would seem to warrant.

OBJECTS OF THE INVENTION

It is therefore an object of the present invention to provide an improved profile shear and method of operating same.

Another object is the provision of such an improved profile shear and method of operating same which overcomes the above-given disadvantages, that is which operates more efficiently than the prior-art systems.

SUMMARY OF THE INVENTION

The instant invention is an improvement on a method of operating a shear wherein a workpiece is pressed by a holddown against a stationary blade so as to leave a piece to be cut off projecting past the blade, a movable blade is displaced in a forward cutting direction past the stationary blade to cut off the piece, and a cut-off holder is pressed in the opposite direction against the piece by a fluid-powered holding cylinder and moves back in the direction as the piece is cut off. According to the invention pressure is substantially completely relieved in the cylinder as soon as the movable blade starts to cut through the workpiece so that the cut-off holder does not substantially resist forward movement in the cutting direction.

Furthermore, according to the invention the movable blade is pressed forward in the direction against the workpiece by means of a main cylinder so that pressure in the main cylinder reaches a maximum level just before the movable blade starts to cut through the workpiece. The pressure in the main cylinder is monitored to trigger relief of pressure in the holding cylinder when the monitored pressure starts to decrease from the maximum level. It is also of course possible to monitor travel of the movable blade or cut-off holder and to trigger relief of pressure in the holding cylinder when the main blade or cut-off holder reaches a predetermined position. Similarly one can monitor elapsed time from the start of a cut through the workpiece and trigger relief of pressure in the holding cylinder a predetermined time after the cut starts.

With the system of this invention, therefore, the movable blade is not working against the cut-off holder. Instead as soon as cutting actually commences, typically as indicated by a drop in pressure in the movable-blade cylinder, the cut-off holder in effect releases and is pushed back against no significant resistance by the sheared-off workpiece end piece. Since the cut-off holder serves primarily to hold the workpiece in place before the actual cutting operation, this release is inconsequential to forming a clean shear cut, but does save considerable energy. As a result the system can be expected to heat less and generally operate more efficiently.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
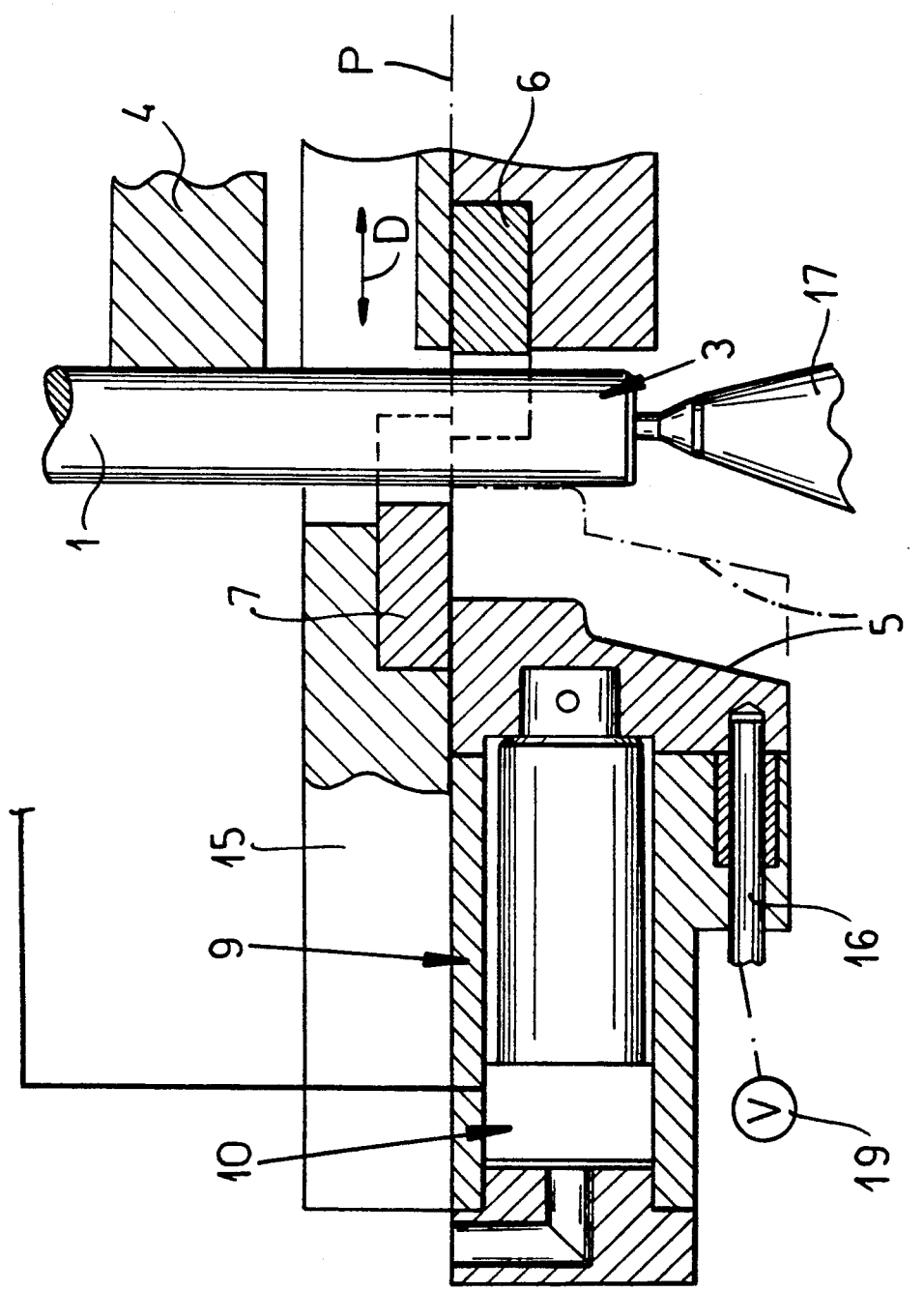
FIG. 1 is a section through the shear according to this invention.
Figure 2:
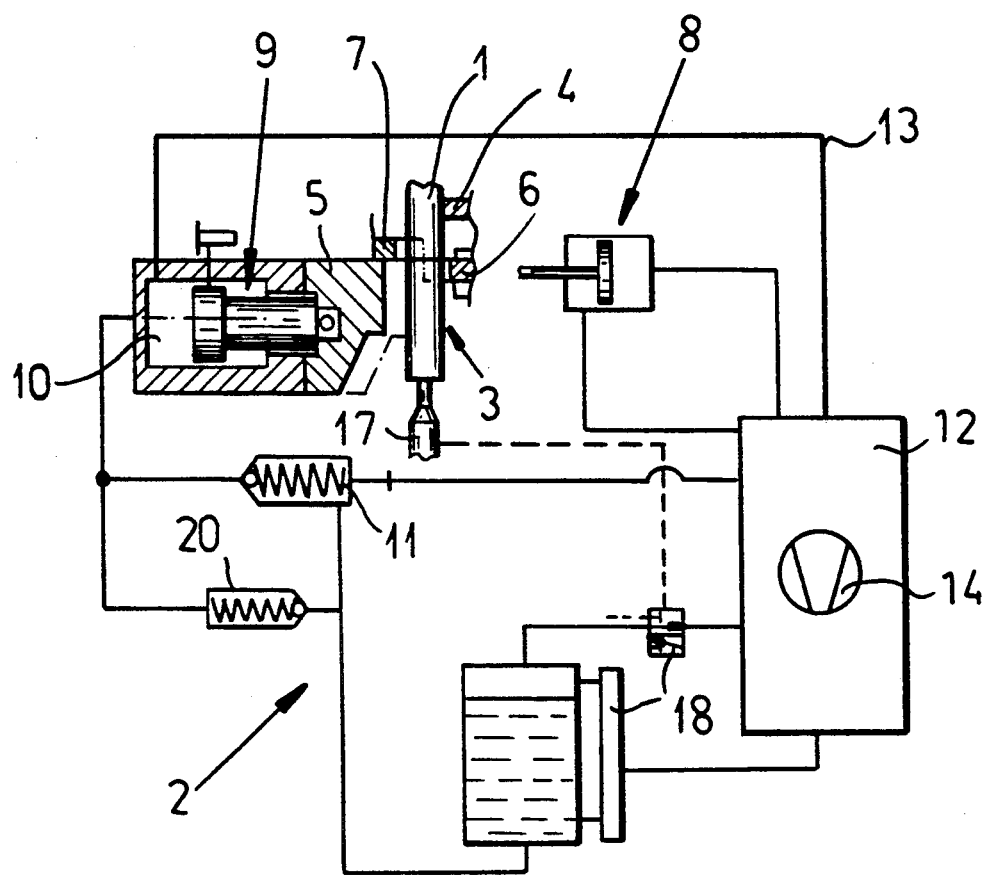
FIG. 2 is a schematic view illustrating how the shear operates.

As seen in FIG. 1 a workpiece 1 is sheared along a plane P by resting it on a fixed blade 7 mounted on a machine frame 15 and pressing it down in a direction D by a standard holddown clamp 4 on this blade 7. The end of the workpiece 1 engages an end stop 17 coupled to a valve/tank arrangement 18 as described in the above-identified German patent document so that an end piece 3 can be cut off the workpiece 1. A movable blade 6 can be pushed by a cylinder 8 down against the end piece 3 and a cut-off holder 5 is pressed by a cylinder 9 having a chamber 10 back in the opposite direction against the piece 3. A control system 12 incorporating a pump 14 is connected directly to both sides of the double-acting actuator 5 of the blade 6, by a line 13 to the back chamber 10 of the cylinder 9, and via a fluid-control system 2 to this chamber 10. An overflow valve 11 in the system 2 can open to relieve pressure in the chamber 10 and a standard check valve 20 is provided.

In accordance with this invention the system 12 monitors pressure in the front compartment of the cylinder 8 as the blade 7 is pressed against the workpiece 1. This pressure increases to a maximum level until the workpiece 1 starts to shear, and then drops regularly as the end piece 3 is cut off. As soon as this pressure starts to drop from the maximum level, the controller 12 opens the overpressure valve 11 completely, thereby depressurizing the chamber 10. Hence once the shearing action starts, at which point the cut-off holder 5 really becomes no longer necessary, the cylinder 8 need not work against the cylinder 9, but only against the workpiece 1. As the workpiece end 3 is being sheared off, the holder 5 is merely pushed back down.

Once the cut is finished, the valve 11 is again closed to restore the holder 5 to its starting position, triggered by action on the end stop 17 and/or by a sensor valve 19 operated by a stem 16 carried on the holder 5 as described in the above-cited German patent document.

Of course it would be within the scope of this invention to open the valve 11 and depressurize the compartment 10 in accordance with a particular position of the blade 6 and/or at a predetermined time after starting or reaching a predetermined pressure. Furthermore, it is within the scope of this invention to trigger venting of the chamber 10 by backward movement of the holder 5 as detected by a switch or valve operated by the position stem 16 so that the instant the cut starts the chamber 10 is depressurized. A computer can be used to monitor pressures and establish the maximum pressure level for a given type of workpiece. In any case the cylinder 9 is depressurized for much of the stroke corresponding to crosswise movement of the end piece 3 as it is sheared off the workpiece.

I claim:

1. In a method of operating a shear where
   a workpiece is pressed by a holddown against a stationary blade so as to leave a piece to be cut off projecting past the blade,
   a movable blade is displaced in a forward cutting direction past the stationary blade to cut off the piece,
   a cut-off holder is pressed in a second direction opposite to the forward cutting direction against the piece by a fluid-powered holding cylinder and moves back in the forward cutting direction as the piece is cut off, the improvement comprising the step of:
   substantially completely relieving pressure in the cylinder as soon as the movable blade starts to cut through the workpiece, whereby the cut-off holder does not substantially resist forward movement in the forward cutting direction.

2. The improved shear-operating method defined in claim 1, further comprising the step of:
   pressing the movable blade forward in the forward cutting direction against the workpiece by means of a main cylinder, whereby pressure in the main cylinder reaches a maximum level just before the movable blade starts to cut through the workpiece;
   monitoring pressure in the main cylinder; and
   triggering relief of pressure in the holding cylinder when the monitored pressure starts to decrease from the maximum level.

3. The improved shear-operating method defined in claim 1, further comprising the step of:
   monitoring travel of the movable blade; and
   triggering relief of pressure in the holding cylinder when the main blade reaches a predetermined position.

4. The improved shear-operating method defined in claim 1, further comprising the step of:
   monitoring elapsed time from the start of a cut through the workpiece; and
   triggering relief of pressure in the holding cylinder a predetermined time after the cut starts.

5. The improved shear-operating method defined in claim 1, further comprising the step of:
   monitoring travel of the cut-off holder; and
   triggering relief of pressure in the holding cylinder when the cut-off holder reaches a predetermined position.

6. A shear for cutting through profiled steel rod workpieces, the shear comprising:
   a stationary blade;
   means including a holddown for pressing a workpiece against the stationary blade so as to leave a piece to be cut off projecting past the blade;
   a movable blade displaceable in a forward cutting direction past the stationary blade to cut off the piece;
   a cut-off holder engageable in a second direction opposite to the forward cutting direction against the piece;
   means including a fluid-powered holding cylinder for pressing the holder in the second direction against the piece as the piece is being cut from the workpiece, whereby during the cutting the holder moves back in the forward cutting direction as the piece is cut off; and
   control means for substantially completely relieving pressure in the cylinder as soon as the movable blade starts to cut through the workpiece, whereby the cut-off holder does not substantially resist forward movement in the cutting direction.

7. The shear defined in claim 6, further comprising:
   means including a main cylinder for pressing the movable blade forward in the forward cutting direction against the workpiece, whereby pressure in the main cylinder reaches a maximum level just before the movable blade starts to cut through the workpiece; and
   means in the control means for monitoring pressure in the main cylinder and for triggering relief of pressure in the holding cylinder when the monitored pressure starts to decrease from the maximum level.

8. The shear defined in claim 6 wherein the control means includes
   means for monitoring travel of the movable blade and for triggering relief of pressure in the holding cylinder when the main blade reaches a predetermined position.

9. The shear defined in claim 6 wherein the control means includes
   means for monitoring elapsed time from the start of a cut through the workpiece and for triggering relief of pressure in the holding cylinder a predetermined time after the cut starts.

10. The shear defined in claim 6 wherein the control means includes
    means for monitoring travel of the cut-off holder and for triggering relief of pressure in the holding cylinder when the cut-off holder reaches a predetermined position.

* * * * *